(12) United States Patent
Radue

(10) Patent No.: US 6,295,972 B1
(45) Date of Patent: Oct. 2, 2001

(54) FUEL DELIVERY USING MULTIPLE FLUID DELIVERY ASSEMBLIES PER COMBUSTION CHAMBER

(75) Inventor: Martin L. Radue, Kenosha, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/538,660

(22) Filed: Mar. 30, 2000

(51) Int. Cl.⁷ .............................. F02M 37/04; F02B 3/00
(52) U.S. Cl. ....................... 123/499; 123/300; 417/417
(58) Field of Search .................................. 123/498, 499, 123/300, 299; 417/417, 490, 499

(56) References Cited

U.S. PATENT DOCUMENTS

| | | | |
|---|---|---|---|
| 4,312,316 | * 1/1982 | Seilly et al. | 123/499 |
| 4,590,904 | * 5/1986 | Wannenwetsch | 123/300 |
| 5,060,610 | * 10/1991 | Paro | 123/300 |
| 5,072,706 | * 12/1991 | Eblen et al. | 123/300 |
| 5,520,154 | * 5/1996 | Heimberg et al. | 123/499 |
| 5,630,401 | * 5/1997 | Binversie et al. | 417/417 |
| 6,095,769 | * 8/2000 | Mckay | 417/417 |

* cited by examiner

Primary Examiner—Thomas N. Moulis
(74) Attorney, Agent, or Firm—Fletcher, Yoder & Van Someren

(57) ABSTRACT

A fuel delivery system for an internal combustion engine employs a plurality of fuel delivery assemblies for each combustion chamber. The fuel delivery system contains a fluid actuator for each respective combustion chamber or cylinder. Each fluid actuator receives fuel from a source of fuel and directs the fuel to the plurality of fuel delivery assemblies for each combustion chamber. The fluid actuators are under the control of a control system. The control system controls the operation of the fluid actuators to provide desired volumes of fuel at desired flow rates to a combustion chamber from the plurality of fuel delivery assemblies.

29 Claims, 5 Drawing Sheets

FUEL DELIVERY USING MULTIPLE FLUID DELIVERY ASSEMBLIES PER COMBUSTION CHAMBER

BACKGROUND OF THE INVENTION

1. Field of the Invention

The present invention relates generally to a system and method for delivering fuel for combustion in an internal combustion engine. More specifically, the present invention relates to a system and method for utilizing a plurality of fuel delivery assemblies to deliver fuel to each combustion chamber of an internal combustion engine.

2. Description of the Related Art

Generally, an internal combustion engine ignites a mixture of air and combustible fuel within one or more combustion chambers to provide rotational motive force, or torque, to do work. Along with many other factors, optimal performance of an internal combustion engine is dependent upon an adequate supply of fuel for combustion. Two measures of engine performance are illustrative of this dependency: engine torque and engine speed (in revolutions per minute). Generally, the torque produced is proportional to the volume of fuel combusted during a given combustion cycle. That is, under proper conditions, the greater the volume of fuel combusted the greater the force produced from the combustion.

For most applications an engine must be able to provide torque at various speeds as well. For engine speed to increase the flow rate of fuel to the combustion chambers must also increase. Increasing the speed of the engine, however, shortens the time for each combustion cycle. Thus, a fuel delivery system must provide fuel for each combustion cycle at increasingly faster rates as the engine speed is increased. Engine torque and speed can both be limited by the inability of the fuel delivery system to provide fuel at these increasingly faster rates. Engine torque can be limited by an inability to supply the engine with a sufficient volume of fuel for the combustion cycle. Engine speed can be limited by the inability to supply the required volumes of fuel at the needed rate.

In addition to combustible fuel, oxygen is also necessary for combustion. There are various methods of providing fuel and oxygen for combustion to a combustion chamber. The surrounding air, typically, acts as the source of oxygen. An air intake draws in the surrounding air, which is mixed with the fuel. Some delivery systems mix air and fuel before the two substances are delivered to the combustion chamber. Alternatively, the fuel and air can be delivered separately and mixed within the combustion chamber. Some systems use carburetors to draw fuel vapor into an air stream that is then fed into the combustion chamber, while other systems use fuel injection to produce fuel vapor from a liquid fuel spray.

There are many current systems and methods of fuel injection. Typically, a programmable logic device controls the operation of the fuel injection system. One or more pumps are used to produce a source of pressurized fuel. A fluid actuator, sometimes a solenoid operated valve, initiates a flow of pressurized fuel to an injection nozzle. In other applications the fluid actuators include a pump that produces a surge in fuel pressure. The surge in fuel pressure causes an injection nozzle to open, allowing pressurized fuel to flow through the injection nozzle. The shape of the outlet of the injection nozzle contributes to the atomization of the fuel as it exits the injection nozzle. Still other fuel injection systems use an integrated pump and injection nozzle assembly.

One method of fuel injection is direct fuel injection. In direct fuel injection liquid fuel under pressure is injected by a fuel injector directly into a cylinder before combustion is initiated in the cylinder by a spark plug. The fuel injection system converts the liquid fuel into an atomized fuel spray. The atomization of the liquid fuel effectively produces fuel vapor, aiding in the ignition of the vapor during combustion in the cylinder. Increasing the pressure of the fuel also increases the atomization of the fuel when injected into a cylinder.

Typically, the fuel delivery system is sized to provide adequate fuel volumes and flow rates for the normal expected range of engine torque and power needs. However, the fuel delivery system may be unable to supply the fuel volumes and rates at engine speeds, torque and power levels above the normal expected range. Thus, it may arise that engine torque, speed and power are limited by the ability of the fuel delivery system to supply fuel for combustion. This is particularly the case when fuel delivery systems for one type of engine are applied to higher performance engines, with correspondingly higher fuel volume and flow rate requirements dictated by higher torque, speed and power capabilities.

One option to prevent the fuel delivery system from being a limiting component is to oversize the fuel delivery system so that it is capable of delivering far more fuel than could ever be needed. However, oversizing the fuel delivery system is an inefficient method of operation as the oversized system generally far outstrips the normal requirements. Therefore, it would be beneficial to have a fuel delivery system that can more efficiently deliver desired volumes of fuel at desired flow rates over a larger range of desired engine speeds than current fuel delivery systems.

There is a need, therefore, for an improved technique for supplying combustible fuel in internal combustion engines which can be readily adapted to various engine configurations and performance capabilities. There is a particular need for a technique for fuel injection systems that can supply the higher volumetric (i.e. volume per cycle) and flow rate requirements of high performance engines, while permitting manufactures and designers to draw upon certain existing injection system designs and components.

SUMMARY OF THE INVENTION

The invention provides a fuel delivery system for an internal combustion engine designed to respond to these needs. The fuel delivery system includes a plurality of fuel delivery assemblies for delivering fuel to each combustion chamber or cylinder. Each of the plurality of fuel delivery assemblies delivering fuel to each combustion chamber receives fuel from a fluid actuator. Each fuel delivery assembly can receive fuel from a respective fluid actuator. Alternatively, each of the fuel delivery assemblies could receive fuel from a plurality of fluid actuators.

The fluid actuators receive fuel from a source of fuel and direct the fuel to the fuel delivery assemblies. The fluid actuators are operated by a control system. The control system operates the fluid actuators to control the volume of fuel delivered to the engine during each engine cycle, or controls the rate at which fuel is delivered through the plurality of fuel delivery assemblies to each combustion chamber. The fluid actuator can include a pump driven by an electric motor to provide surges of pressurized fuel. The fuel delivery may be provided by a plurality of fuel injectors that directly inject pressurized fuel into a combustion chamber. Moreover, the fluid actuators and fuel injectors can be combined to form a pump-nozzle assembly.

According to another aspect of the present invention, an internal combustion engine is provided that includes a combustion chamber or cylinder, a source of fuel, a fluid actuator, a plurality of fuel delivery assemblies for each combustion chamber, and a control system. The control system controls the operation of the fuel delivery system to deliver desired flow rates and volumes of fuel to each combustion chamber.

According to another aspect of the present invention, a method is provided for supplying fuel to an internal combustion engine utilizing a plurality of fuel delivery assemblies to deliver fuel to each combustion chamber.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
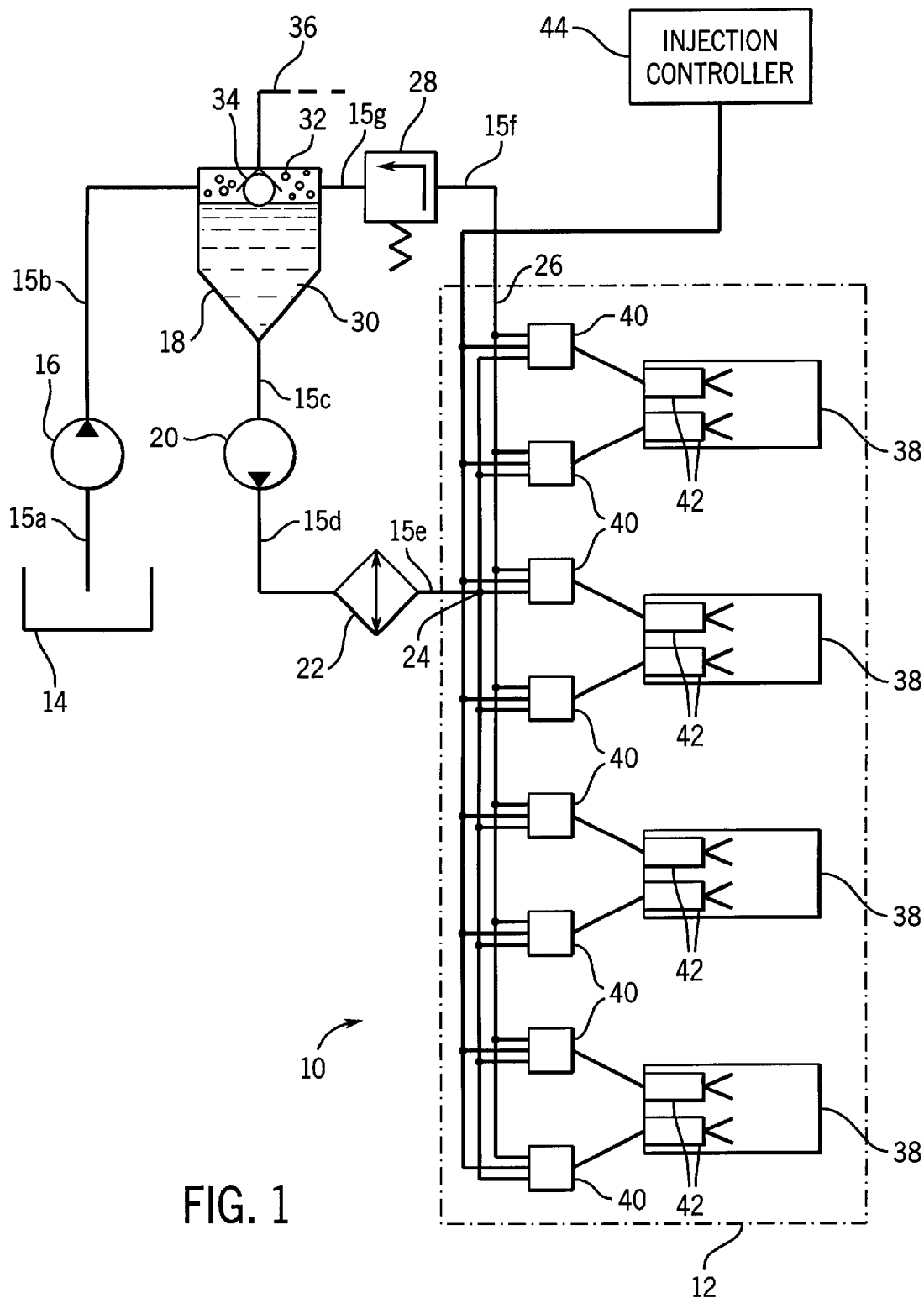
FIG. 1 is a schematic representation of a fuel delivery system utilizing a plurality of fuel delivery assemblies in accordance with certain aspects of the present technique.

Turning now to the drawings and referring first to FIG. 1, a schematic representation is shown of a fuel delivery system 10 for an internal combustion engine 12. In the illustrated embodiment, the fuel delivery system 10 includes, a fuel tank 14, various fuel lines 15, a first fuel pump 16, a gas separation chamber 18, a second fuel pump 20, a fuel filter 22, a fuel supply line 24, a fuel return line 26, a pressure regulator 28, a float valve 34, a ventilation line 36, combustion chambers 38, fluid actuators 40 and fuel injectors 42.

Fuel for combustion is stored in the fuel tank 14. A first fuel line 15a conveys fuel from the fuel tank 14 to a first fuel pump 16. The first fuel pump 16 draws fuel from the fuel tank 16 and pumps the fuel through a second fuel line 15b to a gas separation chamber 18. Fuel flows from the gas separation chamber 18 through a third fuel line 15c at or near the bottom of the gas separation chamber. The fuel is coupled to a second fuel pump 20 that pumps fuel through a fourth fuel line 15d to a fuel filter 22. Fuel then flows from the fuel filter 22 through a fifth fuel line 15e to a common supply line 24 in the internal combustion engine 12. Fuel not injected into a cylinder flows through the fluid actuator 40 to a common return line 26 in the internal combustion engine 12. A sixth fuel line 15f couples the common return line 26 to the pressure regulator 28. The pressure regulator 28 maintains the fuel pressure in the common supply line 24. A seventh fuel line 15g couples fuel from the pressure regulator 28 back to the gas separation chamber 18.

The fuel that is not used for combustion serves to carry away heat, gases or any fuel vapor bubbles from the fluid actuators 40. Liquid fuel 30 and gas/fuel vapor 32 collects in the gas separation chamber 18. A float valve 34 within the gas separation chamber 18 maintains the desired level of liquid fuel 30 in the gas separation chamber 18. The float valve 34 consists of a float that operates a ventilation valve coupled to a ventilation line 36. The float rides on the liquid fuel 30 in the gas separation chamber 18 and closes the ventilation valve when the float rises to a predetermined level. The flow of fuel into the gas separation chamber is regulated by the opening and closing of the ventilation valve. The ventilation valve opens as fuel demand lowers the fuel level in the gas separation chamber.

Fuel from the common supply line 24 is delivered to a plurality of combustion chambers 38 via fluid actuators 40 and fuel delivery assemblies 42. The fluid actuators 40 direct the flow of fuel from the common supply line 24 to the fuel delivery assemblies 42. A fluid actuator 40 can accomplish its function in any suitable manner. For example, the fluid actuator could be a simple solenoid operated valve, or as in the presently preferred embodiment, could be a pressure surge pump producing pulses of pressurized fuel.

An injection controller 44 controls the operation of the fluid actuators 40. The injection controller 44 determines the proper fuel flow rate and fuel volume per engine cycle, and operates the fluid actuators accordingly to provide the desired amount of fuel. In the illustrated embodiment each cylinder receives fuel directed through two combinations of cooperating fluid actuator 40 and a fuel injector 42. However, a single fluid actuator could be used to provide fuel for a plurality of fuel delivery assemblies. For example, a single fluid actuator could be used to provide fuel to two fuel delivery assemblies. In such cases, the fluid actuator could comprise a combination of pressure surge pump and two solenoid operated valves. Moreover, the flow of fuel from the pressure surge pump to each of the plurality of fuel delivery assemblies could flow through a solenoid operated valve. Thus, with both solenoid operated valves open, the pressure surges from the pressure surge pump would cause fuel to flow through two fuel delivery assemblies into a combustion chamber. With one solenoid valve closed, the flow of fuel from the pressure surge pump would flow through only one fuel delivery assembly to a combustion chamber.

Figure 2:
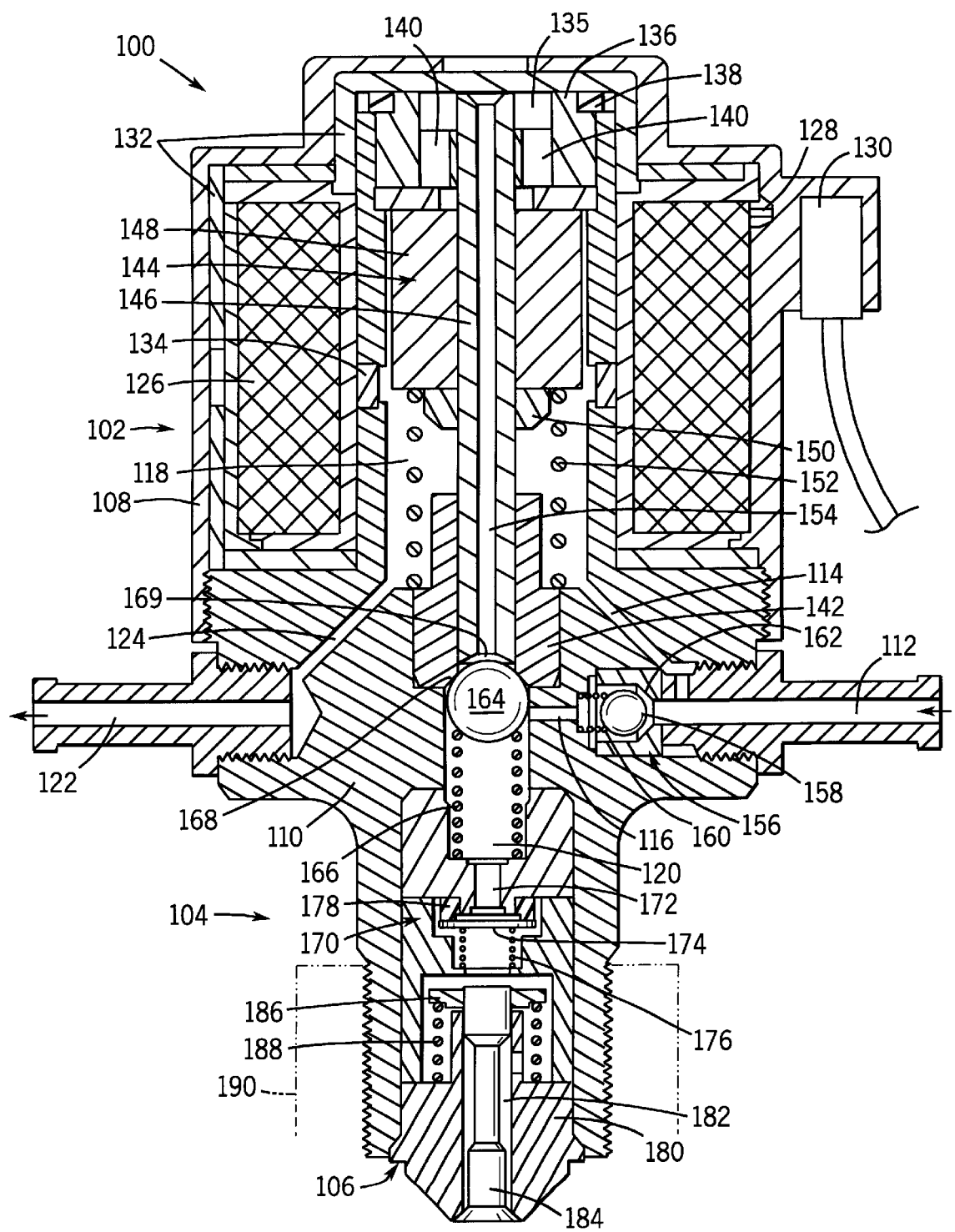
FIG. 2 is a cross-sectional view of a pump-nozzle assembly for use in the system of FIG. 1 at a point during the charging cycle of the pump-nozzle assembly in accordance with a preferred embodiment.
Figure 3:
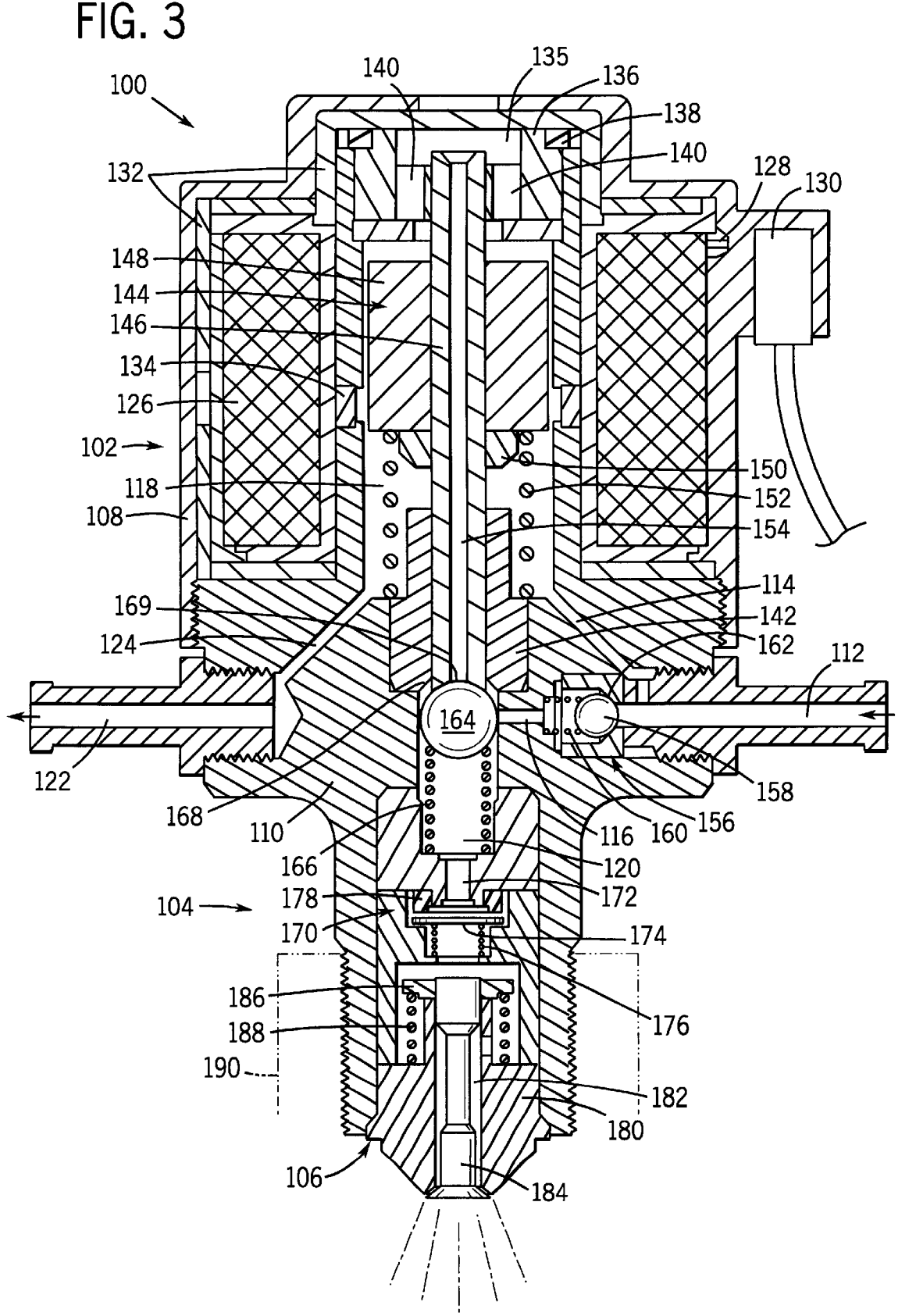
FIG. 3 is a cross-sectional view of a pump-nozzle assembly for use in the system of FIG. 1 at a point during the discharging cycle of the pump-nozzle assembly in accordance with a preferred embodiment.

Referring to FIGS. 2 and 3, an embodiment is shown wherein the fluid actuators 40 and fuel delivery assemblies 42 are combined into a single unit, or pump-nozzle assembly 100. The pump-nozzle assembly 100 is composed of three primary subassemblies: a drive section 102, a pump section 104, and a nozzle 106. The drive section 102 is contained within a solenoid housing 108. A pump housing 110 serves as the base for the pump section 104. The pump housing 110 is attached to the solenoid housing 108 at one end and to the nozzle 106 at an opposite end.

There are several flow paths for fuel within pump-nozzle assembly 100. Initially, fuel enters the pump-nozzle assembly 100 through the fuel inlet 112. Fuel can flow from the fuel inlet 112 through two flow passages, a first passageway 114 and a second passageway 116. A portion of fuel flows through the first passageway 114 into an armature chamber 118. For pumping, fuel also flows through the second passageway 116 to a pump chamber 120. Heat and vapor bubbles are carried from the armature cavity 118 by fuel flowing to an outlet 122 through a third fluid passageway 124. Fuel then flows from the outlet 122 to the common return line 26 (see FIG. 1).

The drive section 102 incorporates a linear electric motor. In the illustrated embodiment, the linear electric motor is a reluctance motor. In the present context, reluctance is the opposition of a magnetic circuit to the establishment or flow of a magnetic flux. A magnetic field and circuit are produced in the reluctance motor by electric current flowing through a coil 126. The coil 126 receives power from the injection controller 44 (see FIG. 1). The coil 126 is electrically coupled by leads 128 to a receptacle 130. The receptacle 130 is coupled by conductors (not shown) to the injection controller 44. Magnetic flux flows in a magnetic circuit 132 around the exterior of the coil 126 when the coil is energized. The magnetic circuit 132 is composed of a material with a low reluctance, typically a magnetic material, such as ferromagnetic alloy, copper or other magnetically conductive materials. A gap in the magnetic circuit 132 is formed by a reluctance gap spacer 134 composed of a material with a relatively higher reluctance than the magnetic circuit 132, such as synthetic plastic.

A fluid brake or cushion within the pump-nozzle assembly 100 acts to slow the upward motion of the moving portions of the drive section 102 once reciprocating motion begins during operation. For this purpose, the upper portion of the solenoid housing 108 is shaped to form a recessed cavity 135. An upper bushing 136 separates the recessed cavity 135 from the armature chamber 118 and provides support for the moving elements of the drive section at the upper end of travel. A seal 138 is located between the upper bushing 136 and the solenoid housing 108 to ensure that the only flow of fuel from the armature chamber 118 to and from the recessed cavity 135 is through fluid passages 140 in the upper bushing 136. The moving portions of the drive section 102 will displace fuel from the armature chamber 118 into the recessed cavity 135 during the period of upward motion. Flow of fuel through the fluid passageways 140 is restricted somewhat to produce a cushioning effect. A lower bushing 142 is included to provide support for the moving elements of the drive section at the lower travel limit and to seal the pump section from the drive section.

A reciprocating assembly 144 forms the linear moving elements of the reluctance motor. The reciprocating assembly 144 includes a guide tube 146, an armature 148, a centering element 150 and a spring 152. The guide tube 146 is supported at the upper end of travel by the upper bushing 136 and at the lower end of travel by the lower bushing 142. An armature 148 is attached to the guide tube 146. The armature 148 sits atop a biasing spring 152 that opposes the downward motion of the armature 148 and surge tube 146, and maintains the guide tube and armature in an upwardly biased or retracted position. Centering element 150 keeps the spring 152 and armature 148 in proper centered alignment. The guide tube 146 has a central passageway 154 which permits the flow of a small volume of fuel when the surge tube 146 moves a given distance through the armature chamber 118 as described below. Flow of fuel through the guide tube 146 permits its acceleration in response to energization of the coil during operation.

When the coil 126 is energized, the magnetic flux field produced by the coil 126 seeks the path of least reluctance. The armature 148 and the magnetic circuit 132 are composed of a material of relatively low reluctance. The magnetic flux lines will thus extend around coil 126 and through magnetic circuit 132 until the magnetic gap spacer 134 is reached. The magnetic flux lines will then extend to armature 148 and an electromagnetic force will be produced to drive the armature 148 downward towards alignment with the reluctance gap spacer 134. When the flow of electric current is removed from the coil by the injection controller 44, the magnetic flux will collapse and the force of spring 152 will drive the armature 148 upwardly and away from alignment with the reluctance gap spacer 134. Cycling the electrical control signals provided to the coil 126 produces a reciprocating linear motion of the armature 148 and guide tube 146 by the upward force of the spring 152 and the downward force produced by the magnetic flux field on the armature 148.

The second fuel flow path provides the fuel for pumping and, ultimately, for combustion. The drive section 102 provides the motive force to drive the pump section 104 to produce a surge of pressure that forces fuel through the nozzle 106. As described above, the drive section 102 operates cyclically to produce a reciprocating linear motion in the guide tube 146. During a charging phase of the cycle, fuel is drawn into the pump section 104. Subsequently, during a discharging phase of the cycle, the pump section 104 pressurizes the fuel and discharges the fuel through the nozzle 106, such as directly into a combustion chamber 38 (see FIG. 1).

During the charging phase fuel enters the pump section 104 from the inlet 112 through an inlet check valve assembly 156. The inlet check valve assembly 156 contains a ball 158 biased by a spring 160 toward a seat 162. During the charging phase the pressure of the fuel in the fuel inlet 112 will overcome the spring force and unseat the ball 158. Fuel will flow around the ball 158 and through the second passageway 116 into the pump chamber 120. During the discharging phase the pressurized fuel in the pump chamber 120 will assist the spring 160 in seating the ball 158, preventing any reverse flow through the inlet check valve assembly 156.

A pressure surge is produced in the pump section 104 when the guide tube 146 drives a pump sealing member 164 into the pump chamber 120. The pump sealing member 164 is held in a biased position by a spring 166 against a stop 168. The force of the spring 166 opposes the motion of the pump sealing member 164 into the pump chamber 120. When the coil 126 is energized to drive the armature 148 towards alignment with the reluctance gap spacer 134, the guide tube 146 is driven towards the pump sealing member 164. There is, initially, a gap 169 between the guide tube 146 and the pump sealing member 164. Until the guide tube 146 transits the gap 169 there is essentially no increase in the fuel pressure within the pump chamber 120, and the guide tube and armature are free to gain momentum by flow of fuel through passageway 154. The acceleration of the guide tube 146 as it transits the gap 169 produces the rapid initial surge in fuel pressure once the surge tube 146 contacts the pump sealing member 164, which seals passageway 154 to pressurize the volume of fuel within the pump chamber.

Referring generally to FIG. 3, a seal is formed between the guide tube 146 and the pump sealing member 164 when the guide tube 146 contacts the pump sealing member 164. This seal closes the opening to the central passageway 154 from the pump chamber 120. The electromagnetic force driving the armature and guide tube overcomes the force of springs 152 and 166, and drives the pump sealing member 164 into the pump chamber 120. This extension of the guide tube into the pump chamber causes an increase in fuel pressure in the pump chamber 120 that, in turn, causes the inlet check valve assembly 156 to seat, thus stopping the flow of fuel into the pump chamber 120 and ending the charging phase. The volume of the pump chamber 120 will decrease as the guide tube 146 is driven into the pump chamber 120, further increasing pressure within the pump chamber and forcing displacement of the fuel from the pump chamber 120 to the nozzle 106 through an outlet check valve assembly 170. The fuel displacement will continue as the guide tube 146 is progressively driven into the pump chamber 120.

Pressurized fuel flows from the pump chamber 120 through a passageway 172 to the outlet check valve assembly 170. The outlet check valve assembly 170 includes a valve disc 174, a spring 176 and a seat 178. The spring 176 provides a force to seat the valve disc 174 against the seat 178. Fuel flows through the outlet check valve assembly 170 when the force on the pump chamber side of the disc produced by the rise in pressure within the pump chamber is greater than the force placed on the outlet side of the valve disc 174 by the spring 176 and any residual pressure within the nozzle.

Once the pressure in the pump chamber 120 has risen sufficiently to open the outlet check valve assembly 170, fuel will flow from the pump chamber 120 to the nozzle 106. The nozzle 106 is comprised of a nozzle housing 180, a passage 182, a poppet 184, a retainer 186, and a spring 188. The poppet 184 is disposed within the passage 182. The retainer 186 is attached to the poppet 184, and spring 188 applies an upward force on the retainer 186 that acts to hold the poppet 184 seated against the nozzle housing 180. A volume of fuel is retained within the nozzle 106 when the poppet 184 is seated. The pressurized fuel flowing into the nozzle 106 from the outlet check valve assembly 170 pressurizes this retained volume of fuel. The increase in fuel pressure applies a force that unseats the poppet 184. Fuel flows through the opening created between the nozzle housing 180 and the poppet 184 when the poppet 184 is unseated. The inverted cone shape of the poppet 184 atomizes the fuel flowing from the nozzle in the form of a spray. The pump-nozzle assembly 100 is preferably threaded to allow the pump-nozzle assembly to be screwed into a cylinder head 190. Thus, the fuel spray from the nozzle 106 may be injected directly into a cylinder.

When the control signal or current applied to the coil 126 is removed, the drive section 102 will no longer drive the armature 148 towards alignment with the reluctance gap spacer 134, ending the discharging phase and beginning a subsequent charging phase. The spring 152 will reverse the direction of motion of the armature 148 and guide tube 146 away from the reluctance gap spacer 134. Retraction of the guide tube from the pump chamber 120 causes a drop in the pressure within the pump chamber, allowing the outlet check valve assembly 170 to seat. The poppet 184 similarly retracts and seats, and the spray of fuel into the cylinder is interrupted. Following additional retraction of the guide tube, the inlet check valve assembly 156 will unseat and fuel will flow into the pump chamber 120 from the inlet 112. The operating cycle the pump-nozzle assembly 100 is thus returned to the condition shown in FIG. 2.

Typically, the control signals supplied to the coil 126 by the injection controller 44 will be in the form of short pulses. The injection controller 44 can establish the volume per injection by the duration of the pulse. The flow rate of fuel can be controlled by the duration and frequency of the pulses.

Figure 4:
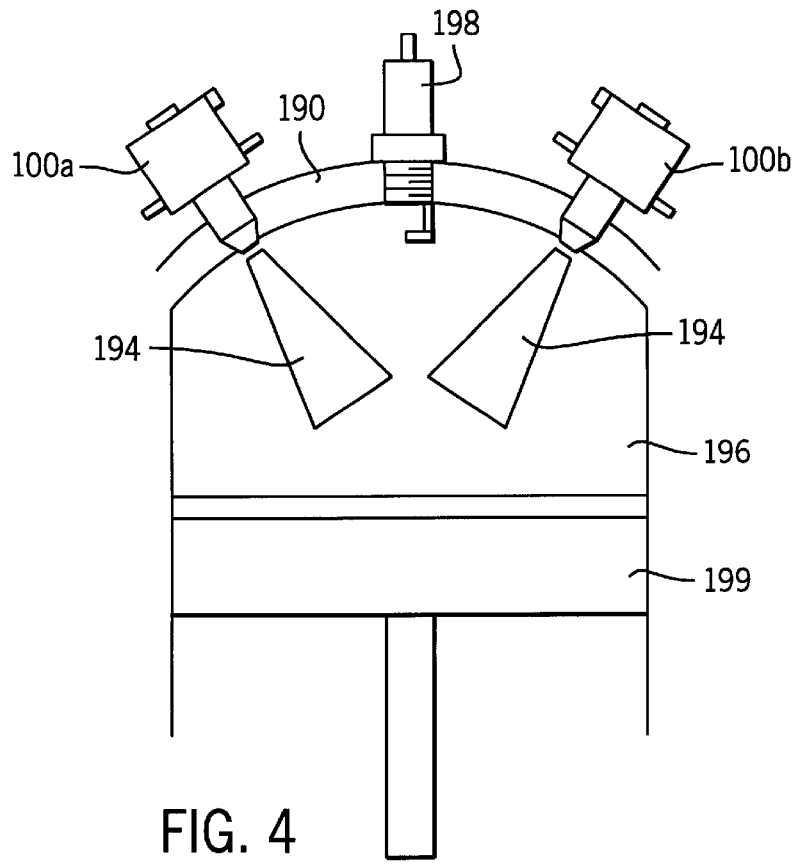
FIG. 4 is a diagrammatical view of one embodiment of a fuel delivery system utilizing a plurality of fuel delivery assemblies.
Figure 5:
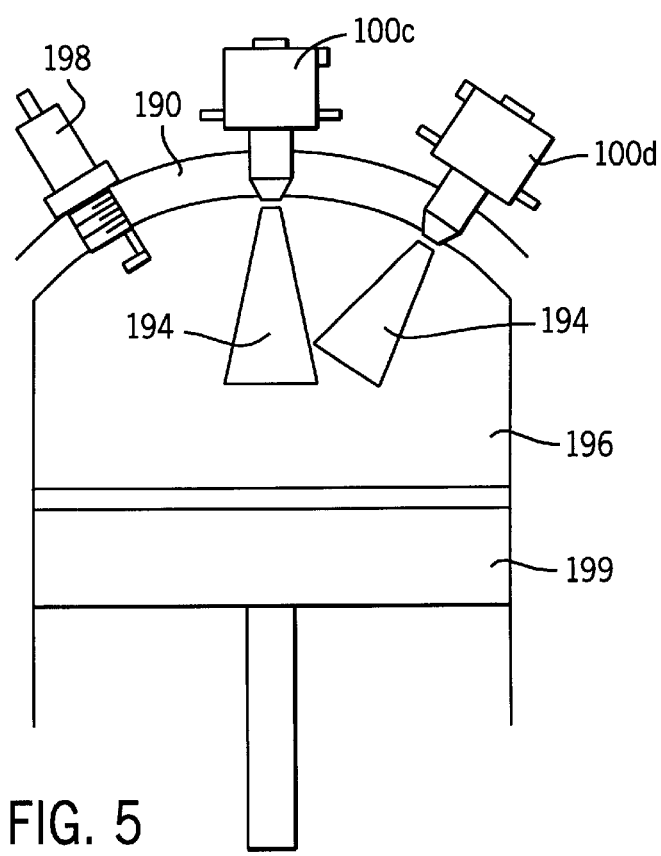
FIG. 5 is a diagrammatical view of an alternative embodiment of a fuel delivery system utilizing a plurality of fuel delivery assemblies.

Referring generally to FIGS. 4 and 5, a cylinder head 190 is shown utilizing a plurality of pump-nozzle assemblies 100. A number of factors may influence the number and orientation of the pump-nozzle assemblies 100 around the cylinder head. These factors may include the desired fuel spray pattern, any spatial constraints, and the desired mode of operation of the system. For example, two pump-nozzle assemblies 100 may be used to simultaneously provide equal amounts of fuel to the cylinder for combustion for all speeds of the engine. This would effectively offer double the volume of fuel available for combustion per cycle as compared to a system employing a single pump-nozzle assembly per cylinder. This would also offer double the flow rate of fuel into the cylinder, as fuel is capable of entering the cylinder from two sources simultaneously. Additionally, a wider dispersion of fuel vapor throughout the cylinder can be achieved with fuel injected from two such fuel delivery assemblies.

Referring to FIG. 4, a first pump-nozzle assembly 100a and a second pump-nozzle assembly 100b may be used to deliver fuel to a cylinder 196 of an internal combustion engine in a first exemplary arrangement. The pump-nozzle assemblies are mounted into a cylinder head 190 at positions generally equidistant from a longitudinal axis through the cylinder. Fuel may be injected simultaneously from the pump-nozzle assemblies 100a and 100b in the form of a cone-shaped fuel spray 194. Injecting the fuel in the form of a spray increases the amount of fuel vapor dispersed throughout the cylinder. Additionally, the two pump-nozzle assemblies 100a and 100b are oriented to widely disperse the fuel vapor. A spark plug 198 ignites the fuel vapor and produce combustion. A piston 199 in the cylinder is coupled to a drive shaft (not shown). Pressure resulting from the combustion will drive the piston 199 downwardly providing motive force to the drive shaft.

Referring to FIG. 5, two pump-nozzle assemblies may be oriented in alternative arrangements, as desired. For example, a primary pump-nozzle assembly 100c may provide fuel for the entire range of engine operation. However, a secondary pump-nozzle assembly 100d may be brought on-line to assist the primary pump-nozzle assembly when higher volumes per cycle or flow rates of fuel are required that are beyond the capabilities of the primary pump-nozzle assembly 100c. In this case, the pump-nozzle assemblies might be oriented to produce an optimal spray pattern for fuel vapor dispersion for fuel provided primarily by the primary pump-nozzle assembly 100c.

Figure 6:
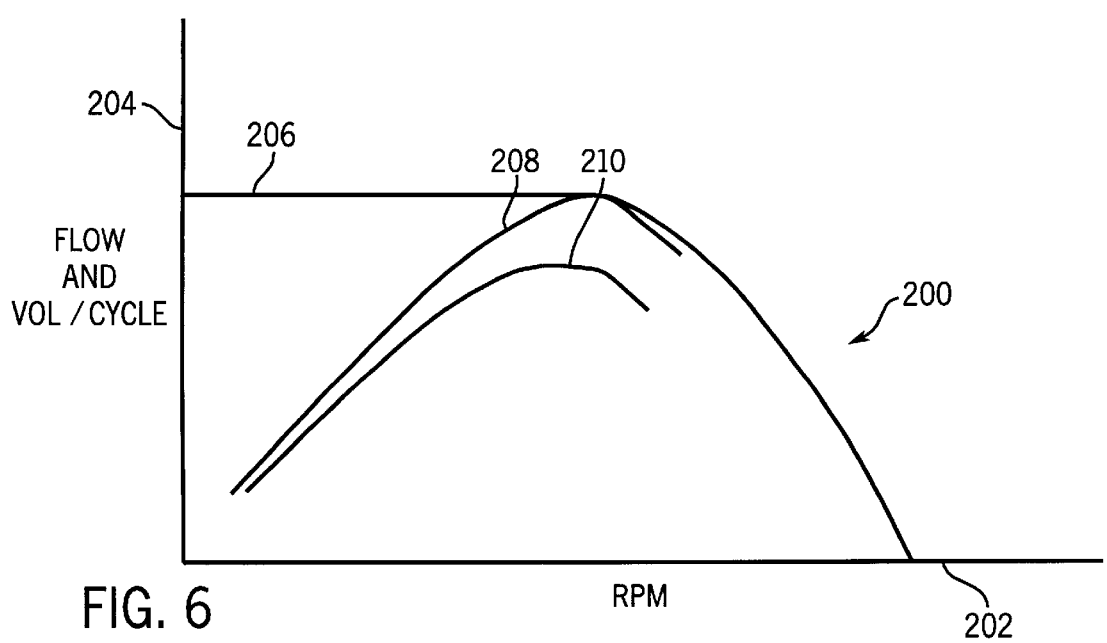
FIG. 6 is a series of graphs illustrating the relationships between the engine power and the flow rate of fuel, and between engine torque and the volume of fuel delivered per engine cycle in an internal combustion engine using one pump-nozzle assembly per cylinder.

Referring to FIG. 6, as will be appreciated by those skilled in the art, the power output by an engine may be represented as a function of the flow rate of fuel combusted. Additionally, the torque of an engine is generally a function of the volume of fuel combusted per engine cycle. A series of graphs 200 are shown to illustrate the relationships between torque, power, fuel flow rate, and fuel volume per engine cycle across a range of engine speeds for an engine utilizing a single pump-nozzle assembly. The horizontal axis 202 in FIG. 6 represents the engine speed in RPM, while the vertical axis 204 represents fuel flow rate and fuel volume per engine cycle.

A first trace 206 of FIG. 6 illustrates the available fuel volume per engine cycle from a single pump-nozzle assembly. As illustrated by the trace 206, a single pump-nozzle assembly can be driven to deliver a given flow rate and flow volume per engine cycle over a substantial range of the rated speed of the engine. At a given point, however, the pump-nozzle assembly can deliver no greater volumetric flow rate or fuel volume per cycle. Thus, trace 206 declines sharply due to such factors as the maximum cycle rate of the pump-nozzle assembly, flow and mechanical constraints of the assembly, and so forth.

A second trace 208 of FIG. 6 is a graph of engine power versus fuel flow rate. Initially, as the engine speed is increased the single pump-nozzle assembly may be driven to increase the fuel flow rate accordingly. The fuel needs of the engine are thus satisfied, and the entire power curve of the engine, represented by trace 208, is available. A third trace 210 is a graph of engine torque versus fuel volume per cycle. As higher torques are demanded from the engine and higher speeds are obtained, the fuel volume per engine cycle is increased accordingly, following the available torque curve of the engine, represented by trace 210.

Figure 7:
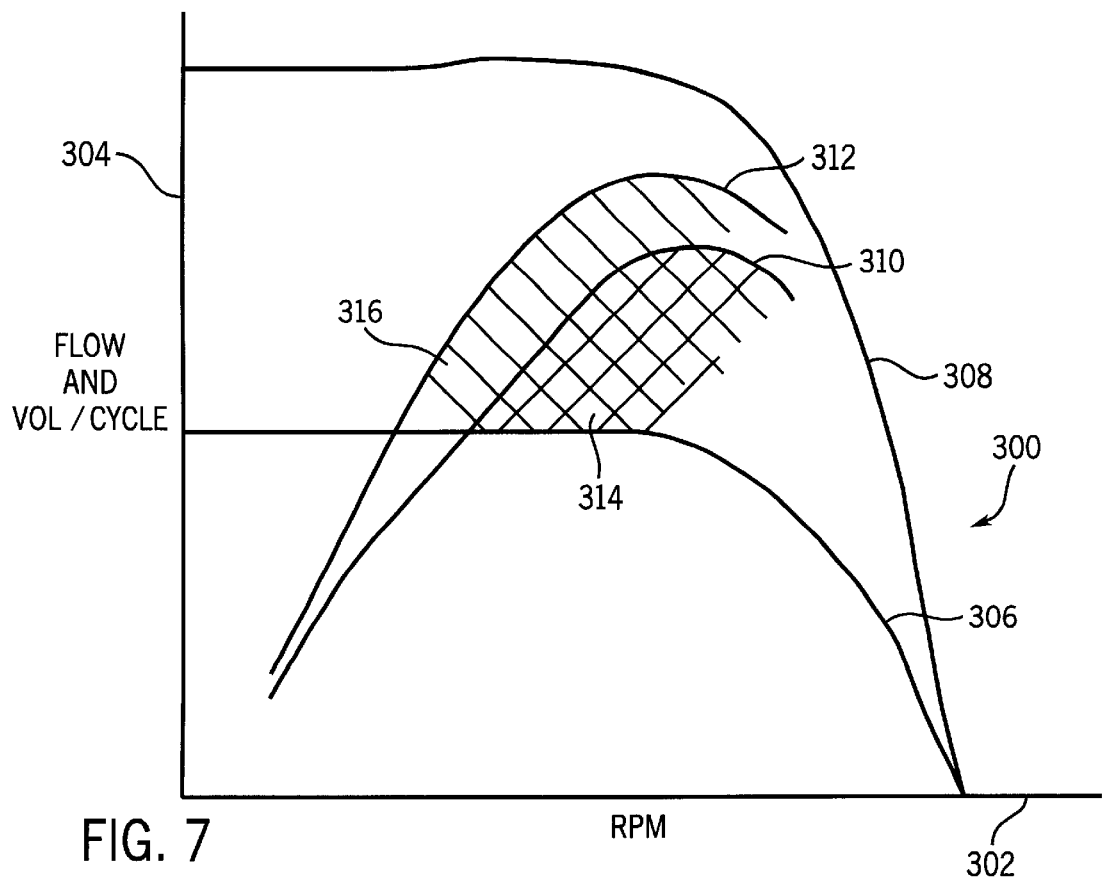
FIG. 7 is a series of graphs illustrating the relationships between the engine power and the flow rate of fuel, and between engine torque and the volume of fuel delivered per engine cycle in an internal combustion engine using two pump-nozzle assemblies per cylinder.

As will be appreciated by those skilled in the art, the pump-nozzle assembly is generally sized to provide for the torque and power performance of the engine. However, higher performance engines may have higher power and torque capabilities than can be provided by flow rates and fuel flow per cycle ratings of a single pump-nozzle assembly. FIG. 7 represents an enhanced performance capability obtained through the use of a plurality of fuel delivery assemblies in accordance with aspects of the present technique.

Referring to FIG. 7, the range of desired engine operation may be such that the fuel flow rate and flow per cycle provided by the above-referenced single pump-nozzle assembly are insufficient. However, the plurality of pump-nozzle assemblies of the present technique allow the engines of higher performance to be adequately supplied with fuel by the combined capacities of the assemblies. A series of graphs 300 are shown to illustrate the relationships between torque, power, fuel flow rate, and fuel volume per engine cycle across a range of engine speeds for an engine utilizing two pump-nozzle assemblies. Again, the horizontal axis 302 represents the engine speed in RPM, while the vertical axis 304 represents fuel flow rate and fuel volume per engine cycle.

The first trace 306 illustrates the fuel flow rate and volume per engine cycle provided by a single pump-nozzle assembly. For the purposes of illustration, the performance characteristics of each of the two pump-nozzle assemblies of FIG. 7 are the same as the single pump-nozzle assembly of FIG. 6. A second trace 308 represents the available fuel flow rate and volume per engine cycle provided by the operation of two pump-nozzle assemblies. Of course, the two assemblies may have different capacities or may actually be driven to provide different flow rates and flows per cycle, as described above.

A third trace 310 illustrates engine power versus fuel flow rate of an enhanced-performance engine. Initially, as the engine speed is increased the pump-nozzle assemblies respond to increase the fuel flow rate. This provides for a corresponding increase in the power available from the engine. However, two pump-nozzle assemblies can continue to supply an increasing flow rate of fuel beyond the point where a single pump-nozzle assembly would reach its limit.

Similarly, a fourth trace 312 illustrates torque available from the engine versus fuel volume per cycle. As the fuel volume per engine cycle is increased, the demands of the engine for the maximum available torque are met by the assemblies. In the illustrated embodiment, the available volume of fuel per engine cycle is roughly double that of a single pump-nozzle assembly. The two pump-nozzle assemblies can continue to supply greater volumes of fuel per injection beyond the point where a single pump-nozzle assembly would reach its limit.

Thus, in the fuel delivery system of the present technique the greater available fuel flow rate enables the power output of the engine to be serviced beyond the capability of a single pump-nozzle assembly. This additional power is shown in the area 314 under trace 310. Additionally, the greater fuel volume per cycle available enables the torque provided by the engine to be serviced beyond the capability of a single pump-nozzle assembly. This is illustrated by the area 316 under trace 312 in FIG. 7.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, the present invention is not limited to any specific orientation of fuel delivery assemblies around a cylinder. Nor is the invention limited to direct fuel injection into a cylinder. For example, a fuel delivery system utilizing a plurality of fuel delivery assemblies has been described wherein a fluid actuator and a fuel delivery assembly are combined in a pump-nozzle assembly. However, a single pump-nozzle assembly may consist of a single fluid actuator and a plurality of fuel delivery assemblies. Alternatively, a single pump-nozzle assembly may consist of a plurality of fluid actuators and a single fuel delivery assembly.

What is claimed is:

1. A fuel delivery system for an internal combustion engine, the system comprising:
   at least one fluid actuator in fluid communication with a source of fuel, wherein the at least one fluid actuator includes a pump, further wherein each pump is driven by a reciprocating linear electric motor;
   a plurality of fuel delivery assemblies in fluid communication with the at least one fluid actuator and a combustion chamber of the internal combustion engine; and
   a control system operative to regulate fuel delivery from the source of fuel to the combustion chamber through the at least one fluid actuator and at least one of the fuel delivery assemblies in the plurality of fuel delivery assemblies.

2. The system as recited in claim 1, further comprising a plurality of fluid actuators, wherein each fuel delivery assembly in the plurality of fuel delivery assemblies is in fluid communication with at least one fluid actuator in the plurality of fluid actuators.

3. The system as recited in claim 2, wherein each fuel delivery assembly in the plurality of fuel delivery assemblies is in fluid communication with one fluid actuator in the plurality of fluid actuators.

4. The system as recited in claim 1, wherein the control system controls the electric power to the electric motor in the at least one fluid actuator.

5. The system as recited in claim 4, wherein the pump is a pressure surge pump.

6. The system as recited in claim 1, wherein the control system includes a computer.

7. The system as recited in claim 1, wherein at least one of the plurality of fuel delivery assemblies injects the fuel directly into a combustion chamber.

8. The system as recited in claim 1, wherein at least one of the plurality of fuel delivery assemblies is mounted to the combustion chamber.

9. The system as recited in claim 1, wherein at least one of the plurality of fluid actuators is mounted to at least one of the fuel delivery assemblies.

10. An internal combustion engine, comprising:
at least one combustion chamber;
a source of fuel;
at least one fluid actuator, wherein the at least one fluid actuator receives fuel from the source of fuel;
a plurality of fuel delivery assemblies in fluid communication with the at least one fluid actuator and with the at least one combustion chamber; and
a control system regulating operation of the fuel delivery system to deliver desired flow rates of fuel to the at least one combustion chamber, wherein the control system cycles the at least one fluid actuator to provide a desired injection volume per cycle of the engine.

11. The system as recited in claim 10, further comprising a plurality of fluid actuators, wherein each fuel delivery assembly in the plurality of fuel delivery assemblies is in fluid communication with at least one fluid actuator in the plurality of fluid actuators.

12. The system as recited in claim 11, wherein each fuel delivery assembly in the plurality of fuel delivery assemblies is in fluid communication with a single fluid actuator in the plurality of fluid actuators.

13. The system as recited in claim 12, wherein each fluid actuator includes a pump driven by an electric motor.

14. The system as recited in claim 13, wherein the control system controls electric power provided to the pump driven by an electric motor in each fluid actuator.

15. The system as recited in claim 14, wherein the control system controls the electric power provided to the pump driven by the electric motor of each fluid actuator to provide desired flow rates of fuel to the at least one combustion chamber.

16. The system as recited in claim 15, wherein the pump of each fluid actuator is a pressure surge pump.

17. A fuel delivery system for an internal combustion engine, comprising:
a source of pressurized fuel;
a plurality of fuel injectors for directing fuel to a combustion chamber;
at least one fluid actuator, wherein each of the plurality of fuel injectors can receive pressurized fuel from the source of pressurized fuel through the at least one fluid actuator, wherein each fluid actuator includes a pressure surge pump driven by an electric motor; and
a control system for controlling operation of the fuel delivery system to direct pressurized fuel from the source of pressurized fuel through the at least one fluid actuators to at least one of the plurality of fuel injectors and thereby to a combustion chamber.

18. The system as recited in claim 17, further comprising a plurality of fluid actuators, wherein each fuel injector in the plurality of fuel injectors is in fluid communication with at least one fluid actuator in the plurality of fluid actuators.

19. The system as recited in claim 18, wherein each fuel injector is in fluid communication with a single fluid actuator.

20. The system as recited in claim 17, wherein the control system controls electric power provided to the electric motor of each fluid actuator in the plurality of fluid actuators to provide desired flow rates of fuel to the at least one combustion chamber.

21. A method for supplying fuel to an internal combustion engine, the method comprising the steps of:
pumping fuel from a source of fuel to a plurality of fluid actuators, each of the plurality of fluid actuators being in one-to-one fluid communication with a fuel delivery assembly of a plurality of fuel delivery assemblies, and the plurality of fuel delivery assemblies being in fluid communication with a combustion chamber;
operating a plurality of fluid actuators to produce a desired flow rate of fuel for combustion from the source of fuel to the plurality of fuel delivery assemblies; and
operating the fuel delivery assemblies to deliver the desired flow rate of fuel for combustion from the plurality of fuel delivery assemblies to a combustion chamber.

22. The method as recited in claim 21, comprising the further step of operating the at least one fluid actuator to impart pressure to the fuel.

23. The method as recited in claim 22, comprising the further step of operating at least one of the plurality of fuel delivery assemblies to inject fuel directly into a combustion chamber.

24. A fuel delivery system for an internal combustion engine, the system comprising:
at least one fluid actuator in fluid communication with a source of fuel;
a plurality of fuel delivery assemblies in fluid communication with the at least one fluid actuator and a combustion chamber of the internal combustion engine; and
a control system operative to regulate fuel delivery from the source of fuel to the combustion chamber through the at least one fluid actuator and at least one of the fuel delivery assemblies in the plurality of fuel delivery assemblies, wherein the control system includes a computer.

25. A fuel delivery system for an internal combustion engine, the system comprising:
at least one fluid actuator in fluid communication with a source of fuel;
a plurality of fuel delivery assemblies in fluid communication with the at least one fluid actuator and a combustion chamber of the internal combustion engine; and
a control system operative to regulate fuel delivery from the source of fuel to the combustion chamber through the at least one fluid actuator and at least one of the fuel delivery assemblies in the plurality of fuel delivery assemblies,
wherein at least one of the plurality of fluid actuators is mounted to at least one of the fuel delivery assemblies.

26. An internal combustion engine, comprising:
at least one combustion chamber;
a source of fuel;
a plurality of fluid actuators, wherein the plurality of fluid actuators receive fuel from the source of fuel;
a plurality of fuel delivery assemblies in fluid communication with the plurality of fluid actuators and with the at least one combustion chamber, wherein each fuel delivery assembly in the plurality of fuel delivery assemblies is in fluid communication with a single fluid actuator in the plurality of fluid actuators; and
a control system regulating operation of the fuel delivery system to deliver desired flow rates of fuel to the at least one combustion chamber.

27. A fuel delivery system for an internal combustion engine, comprising:

a source of pressurized fuel;

a plurality of fuel injectors for directing fuel to a combustion chamber;

a plurality of fluid actuators, wherein each of the plurality of fuel injectors can receive pressurized fuel from the source of pressurized fuel through at least one fluid actuator, further wherein each fuel injector in the plurality of fuel injectors is in fluid communication with a single fluid actuator in the plurality of fluid actuators; and a control system for controlling operation of the fuel delivery system to direct pressurized fuel from the source of pressurized fuel through the at least one fluid actuators to at least one of the plurality of fuel injectors and thereby to a combustion chamber.

28. An internal combustion engine, comprising:

at least one combustion chamber;

a source of fuel;

at least one fluid actuator, wherein the at least one fluid actuator receives fuel from the source of fuel;

a plurality of fuel delivery assemblies in fluid communication with the at least one fluid actuator and with the at least one combustion chamber; and a control system regulating operation of the fuel delivery system to deliver desired flow rates of fuel to the at least one combustion chamber; and a spark plug to ignite the fuel within the at least one combustion chamber.

29. A method of operating an internal combustion engine, the method comprising the steps of:

pumping fuel from a source of fuel to at least one fluid actuator, the at least one fluid actuator being in fluid communication with a plurality of fuel delivery assemblies, and the plurality of fuel delivery assemblies being in fluid communication with a combustion chamber;

operating the at least one fluid actuator to produce a desired flow rate of fuel for combustion from the source of fuel to the plurality of fuel delivery assemblies;

operating the fuel delivery assemblies to deliver the desired flow rate of fuel for combustion from the plurality of fuel delivery assemblies to a combustion chamber; and igniting the fuel within the combustion chamber with a spark provided by a spark plug.

* * * * *